Patented May 27, 1941

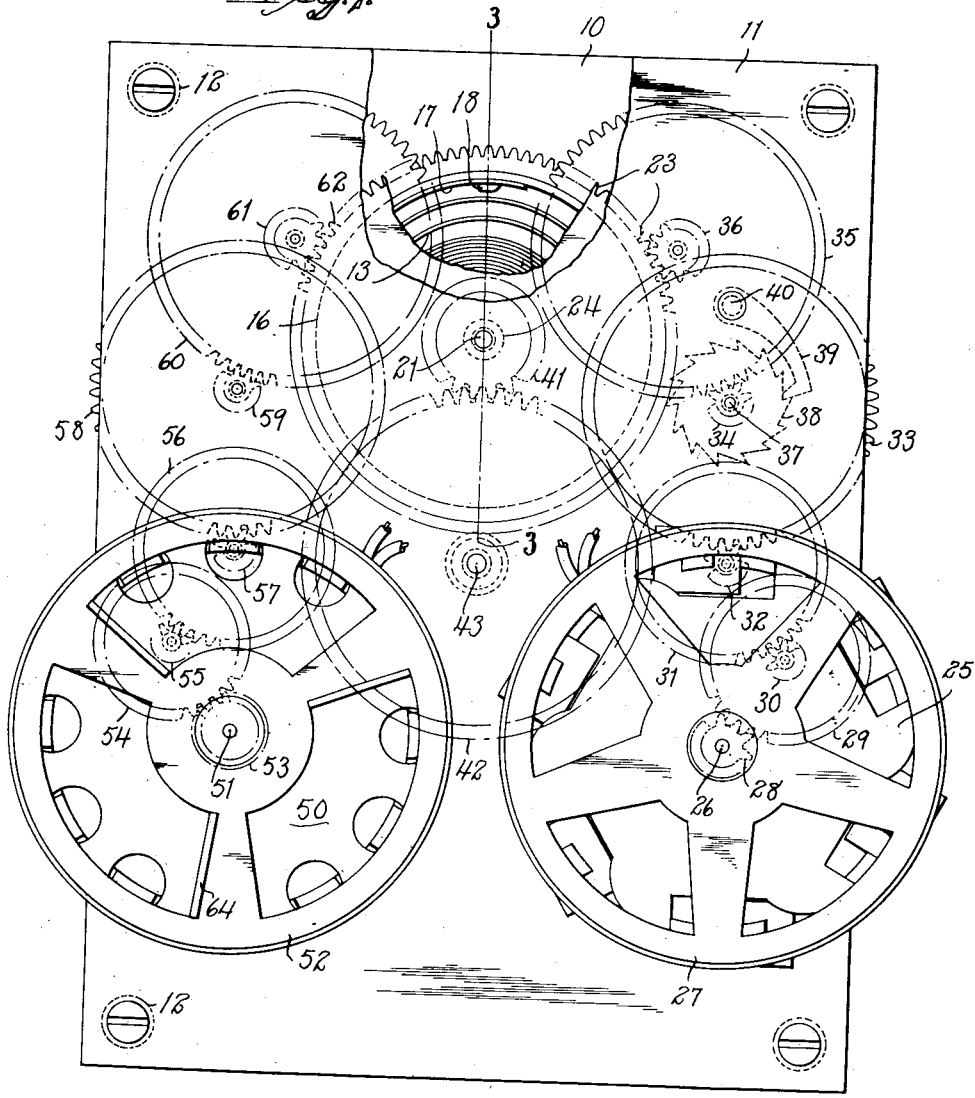

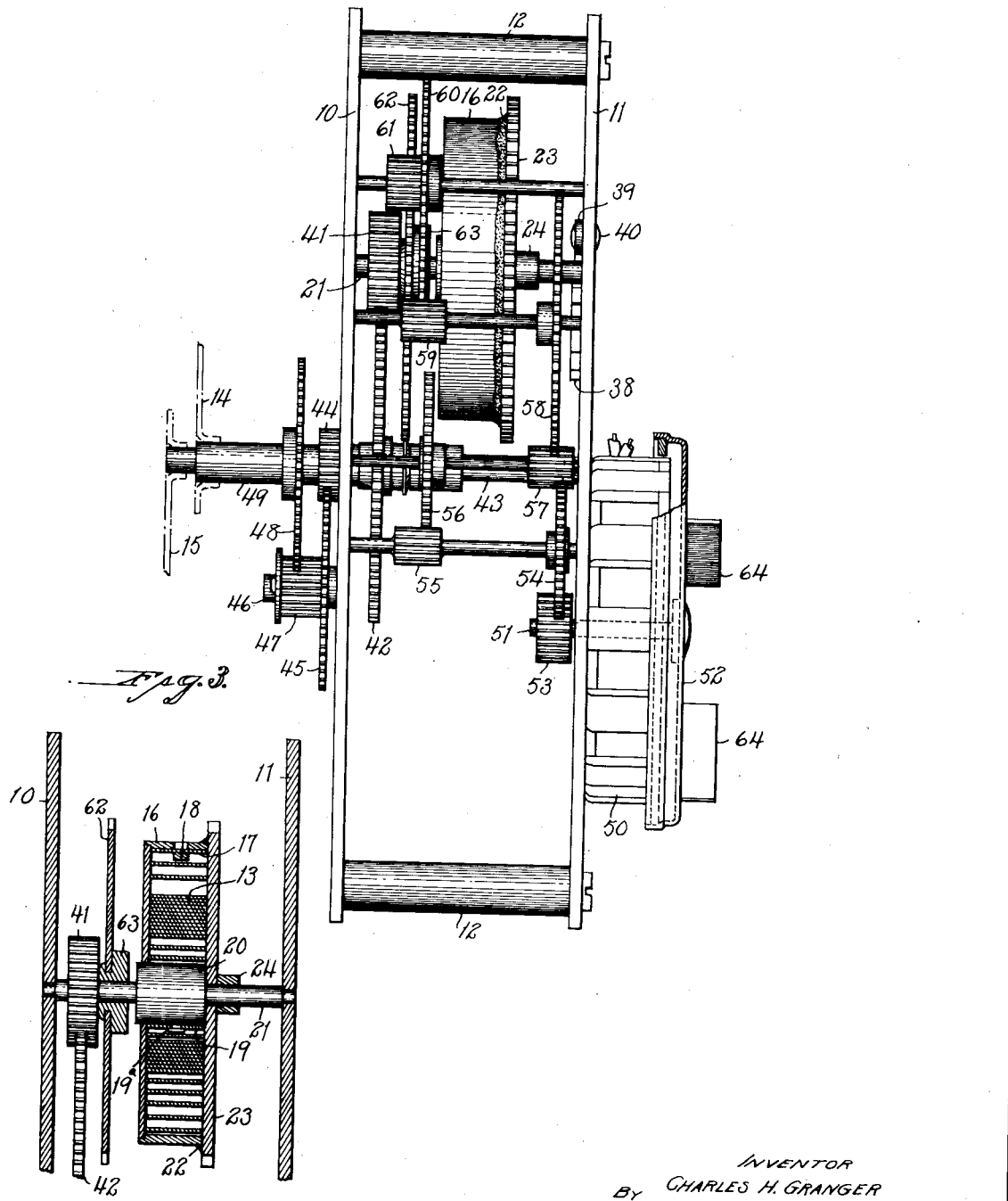

2,243,734

UNITED STATES PATENT OFFICE 2,243,734

MAINTAINED POWER SYNCHRONOUS ELECTRIC CLOCK AND OTHER TIMING DEVICES

Charles H. Granger, Waterbury, Conn., assignor to Waterbury Clock Company, Waterbury, Conn., a corporation Application July 30, 1930, Serial No. 471,654

1 Claim. (Cl. 58—26)

This invention relates to an improvement in maintained-power synchronous electric clocks and other timing and time-measuring devices, that is to say, timing devices which are provided with energy-storing means such as a spring.

The main object of this invention is to provide a simple, reliable and superior synchronous electric timing device capable of normally functioning in consonance with the beat of a sinusoidal electric current, and capable of continued functioning during interruptions in the said current.

With the above and other objects in view as will appear from the following, my invention consists in a synchronous electric timing or time-measuring device having cerain details of construction and combinations and arrangements of parts as will be hereinafter described and particularly recited in the claim.

For the illustration of my invention, I have chosen an electric timing device in the form of a clock, that is to say, a timing device which visibly indicates the passage of time, but it will be readily understood that my invention is applicable to other forms of timing devices or time meters such as those which automatically perform a given function after the lapse of a predetermined time interval, without necessarily visually indicating the time of day.

In the accompanying drawings:

Fig. 1 is a view mainly in rear elevation and partly in section of a maintained-power synchronous electric clock-movement embodying my invention;

Fig. 2 is a view thereof in side elevation; and

Fig. 3 is a broken transverse sectional view taken on the line 3—3 of Fig. 1.

The particular electric clock herein chosen for the illustration of my invention consists, as shown, of a pair of complementary movement-plates 10 and 11, held in spaced relationship by means of four (more or less) pillars 12.

Installed between the movement-plates 10 and 11, above referred to, I mount a spiral-spring 13 which functions in my improved clock as energy-storing means for driving the hour- and minute-hands 14 and 15 respectively under the restraint of a synchronous electric governor, as will hereinafter appear. The said spring 13 is housed within a spring-barrel 16 and has its outer convolution 17 coupled thereto by means of the usual inwardly-projecting finger 18, while its inner convolution 19 is coupled by means of a stud 19ᵃ to a hub 20, forming a feature of an arbor 21 which is journalled at its respective opposite ends in the front and rear movement-plates 10 and 11.

The spring-barrel 16, above referred to, is secured by solder as at 22 to a large gear-wheel 23, mounted upon the arbor 21 aforesaid, with freedom for rotation with respect thereto, and held against axial shifting thereon by means of the hub 20 and a collar 24 driven upon the said arbor 21, as shown in Fig. 3 of the drawings.

The gear-wheel 23 and the spring-barrel 16, above referred to, are rotated for the purpose of winding the spiral-spring 13 by means of a small self-starting electric motor 25 which in itself may be of any well-known form and requires no detailed description other than to say that the shaft 26 of its rotor 27 is provided with a driving-pinion 28.

The pinion 28, just above referred to, effects the turning of the gear-wheel 23 and the spring-barrel 16 for the purpose of winding the spring 13 through the intermediary of a gear and pinion train consisting of a gear-wheel 29 meshing into the pinion 28, a pinion 30, gear-wheel 31, pinion 32, gear-wheel 33, pinion 34, gear-wheel 35 and pinion 36 meshing into the gear-wheel 23, already referred to.

To prevent the spring 13 from reversely turning the rotor 27 of the motor 25, if the supply of current thereto should fail, I provide the arbor 37 upon which the gear-wheel 33 and pinion 34 are mounted, with a ratchet-wheel 38, the teeth of which are engaged by a pawl 39 pivotally mounted by means of a stud 40 to the rear movement-plate 11.

To enable the spring 13 to drive the hour- and minute-hands 14 and 15, the arbor 21 which is rotated by the said spring, has staked to its forward end a pinion 41 meshing into and driving a gear-wheel 42, mounted upon the center arbor 43 of the clock, to the forward end of which arbor the minute-hand 15, already described, is secured.

The hour-hand 14 is driven in the usual manner of clock-trains by a so-called "dial-work" consisting of a pinion 44 carried by the center arbor 43 and meshing into a dial-wheel 45 mounted upon a stud 46 projecting from the front movement-plate 10, and carrying a pinion 47 meshing into and driving an hour-wheel 48 mounted, with freedom for rotation, upon the center arbor 43 and carrying a forwardly-projecting sleeve 49 upon the forward end of which is mounted the hour-hand 14.

From the foregoing, it will be seen that the self-starting electric motor 25 serves to wind the spiral-spring 13, which in turn effects the movement of the time-indicating means consisting of the hour- and minute-hands 14 and 15. Now, it will be appreciated that the arrangements of parts above described would rotate the hour- and minute-hands at speeds in all probability not in conformity with correct time but for the provision of a synchronous electric governing device, which will be presently described and which normally functions to interlock the said hands with a sinusoidal alternating current, so that so long as the pulsations in the current are maintained at a correctly-timed beat, the clock will keep correspondingly-correct time.

The governing device consists, as herein shown, of a synchronous electric motor which, however, it is to be borne in mind, does not in the present instance ordinarily function as a motor, but normally as a constant-speed electric governor to electromagnetically interlock the timing-means, such as the hands 14 and 15, with the beat of the sinusoidal electric current supplied to it, and may, therefore, be said to have inherent electromagnetic braking capacity, inasmuch as it will positively hold back the spring 13 from driving the hands or other time-means as super-speeds, should such be the tendency of the said spring.

Since the constant-speed electric governor 50, herein shown, is in the form of a common and well-known synchronous electric motor, it requires no detailed description other than to say that the shaft 51 of its rotor 52 is provided at its forward end with a pinion 53 which is mechanically connected to the arbor 21 and hence to the hour- and minute-hands 14 and 15 by a train of gears and pinions consisting, as shown, of a gear-wheel 54 meshing into the said pinion 53, a pinion 55, gear-wheel 56, pinion 57, gear-wheel 58, pinion 59, gear-wheel 60, pinion 61 and gear-wheel 62. The gear-wheel 62 is staked upon a hub 63 which in turn is staked upon the arbor 21 already described.

For convenience in describing the operation of the clock herein chosen for the illustration of my invention, let it be presumed that the current is flowing through both the winding-motor 25 and the constant-speed electric governor 50, and further that the spring 13 is already partly wound. Under the circumstances just above referred to, the spring 13 will now drive the hour- and minute-hands 14 and 15, but owing to the gear-train connections between the arbor 21 upon which the spring is mounted (and hence the said hands) and the pinion 53 of the governor, the driving urge of the spring 13 will be restrained, when restraint is required, from rotating the said hands faster than is permitted by the rotor 52 of the synchronous governor, which latter will keep in step or, in other words, will be interlocked with the beat of the sinusoidal electric current supplied to it.

From the foregoing, therefore, it will be seen that despite the variable urge of the spring 13, the hour- and minute-hands 14 and 15 can be driven no faster thereby than is permitted by the constant-speed electric governor 50 so that providing the beat of the current supplied to the said governor is correct in its timing, the hands 14 and 15 must move at a correspondingly constant speed.

Meanwhile, the self-starting winding-motor 25 will continue to wind the spring 13 through the outer convolution 17 thereof while the inner convolution 19 thereof is engaged in driving the arbor 21 and hence the hands 14 and 15. Preferably, when an electric winder is employed, as herein shown, the speed thereof will be sufficient to wind the spring 13 slightly faster than it unwinds itself in driving the hands, so that ultimately, during a long period of operation, the convolutions of the said spring will become tightly wound, in which case the winding-motor 25 will exert, in a certain sense, a direct driving urge upon the hour- and minute-hands 14 and 15 through the intermediary of the said spring which is now tightly wound, but owing to the connection of the constant-speed electric governor 50 with the said hands, the latter will be limited to a speed in conformity with the beat of the current passing through the said governor notwithstanding the added urge to drive them faster, which at this time is being imposed by the winding-motor 25.

Now let it be supposed that the current-supply should temporarily fail, in which case the winding-motor 25 would cease its forward rotation and would be prevented from being reversely rotated under the tension of the spring 13 by the action of the pawl 39 and ratchet-wheel 38. Meanwhile, the inner convolution of the spring 13 will continue to effect the turning of the hands 14 and 15, and also of the rotor 52 of the governor 50, but since at this time no current is flowing through the said governor, it cannot discharge its normal function of electrically interlocking the hands with the beat of the sinusoidal current.

Now under the circumstances just above referred to, and in the accidental absence of any electric governing for the driving urge of the spring 13 in operating the hands 14 and 15, I preferably provide air-vanes 64 to act as an emergency speed control to keep the hands from running away by retarding the free action of the spring, which would at this time tend to rotate the hands 14 and 15 faster than at the correct speed. These vanes 64 or equivalent mechanical-retarders, may be located anywhere in the train of parts driven by the spring 13 but as herein shown, I preferably mount them upon the rotor 52 of the constant-speed electric governor.

When the current again resumes its flow, the electric governor 50 will immediately become interlocked with the said current so as to hold the hands 14 and 15 to a speed in accordance with the beat of the said current and the self-starting winding-motor 25 will again resume its function of winding the spring 13.

I wish to call particular attention to the fact that regardless of the means (either manual or automatic) employed for energizing the energy-storing driving-means which latter, in the instance herein shown, is in the form of a spiral-spring, that the said energy-storing driving-means is prevented from driving the timing-means such as the hands 14 and 15 faster than is permitted by the beat of a sinusoidal electric current acting through a constant-speed electric governor such as 50. And further, that in the event of the cessation of current-flow through the said governor, the energy-storing driving-means will act to keep the clock running during the break in the current at a substantially correct rate.

The invention may be carried out in other specific ways than those herein set forth without departing from the spirit and essential characteristics of the invention, and the present embodiments are, therefore, to be considered in all respects as illustrative and not restrictive, and all changes coming within the meaning and equivalency range of the appended claim are intended to be embraced therein.

I claim:

In a time-keeping device, the combination of an energy-storing motor, a synchronous electric brake, gearing connecting said motor with said brake, an electric induction motor, gearing connecting said induction motor and said energy-storing motor, and mechanical speed-governing means connected to said synchronous brake to rotate continuously therewith, said last-named means being effective to perform its function only when said synchronous brake is ineffective.

CHARLES H. GRANGER.